US012213077B2

(12) United States Patent
Jung

(10) Patent No.: US 12,213,077 B2
(45) Date of Patent: Jan. 28, 2025

(54) ELECTRONIC DEVICE FOR REDUCING POWER CONSUMPTION IN NETWORK ON BASIS OF WI-FI DIRECT PROTOCOL, AND METHOD RELATED THERETO

(71) Applicant: Samsung Electronics Co., Ltd., Suwon-si (KR)

(72) Inventor: Buseop Jung, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 18/468,286

(22) Filed: Sep. 15, 2023

(65) Prior Publication Data

US 2024/0007953 A1    Jan. 4, 2024

Related U.S. Application Data

(63) Continuation of application No. 17/299,187, filed as application No. PCT/KR2019/016498 on Nov. 27, 2019, now Pat. No. 11,800,453.

(30) Foreign Application Priority Data

Dec. 7, 2018    (KR) .................. 10-2018-0156673

(51) Int. Cl.
*H04W 52/02*  (2009.01)
*H04W 4/08*   (2009.01)
(Continued)

(52) U.S. Cl.
CPC ......... *H04W 52/0251* (2013.01); *H04W 4/08* (2013.01); *H04W 52/0229* (2013.01);
(Continued)

(58) Field of Classification Search
CPC .............. H04W 52/0251; H04W 4/08; H04W 52/0229; H04W 52/027; H04W 88/04;
(Continued)

(56) References Cited

U.S. PATENT DOCUMENTS 8,811,426 B1* 8/2014 Banerjea ............... H04W 72/02
                                                    370/468
8,836,587 B2  9/2014 Darnell et al.
(Continued)

FOREIGN PATENT DOCUMENTS

EP    2 356 848 A2    8/2011
EP    2 592 878 A2    5/2013
(Continued)

OTHER PUBLICATIONS

Camps-Mur et al.; Device to device communications with WiFi Direct: overview and experimentation; IEEE Wireless Communications; XP055538954; www.it.uc3m.es/pablo/papers/pdf/2012_camps_commag_wi-fidirect.pdf; Jun. 1, 2013.
(Continued)

*Primary Examiner* — Marisol Figueroa
(74) *Attorney, Agent, or Firm* — Jefferson IP Law, LLP

(57) ABSTRACT

An electronic device comprises a display, a memory, a wireless communication circuit supporting a Wi-Fi Direct protocol, and a processor operatively connected to the display, the memory, and the wireless communication circuit, wherein the processor may be configured to create, through the wireless communication circuit, a first group on the basis of a first channel attribute with an external electronic device, the first channel attribute including at least one of a frequency band or a bandwidth, detect an occurrence of an event associated with a power save, transmit, through the wireless communication circuit, a first request message to the external electronic device that requests to change the first channel attribute to a second channel attribute at least partially different from the first channel attribute, receive, through the wireless communication circuit, a first response message from the external electronic device, store profiles of the first group in the memory, and create a second group on the basis of the external electronic device and the second (Continued)

channel attribute by using profiles of the first group and a connection method of a persistent group defined in the Wi-Fi Direct protocol.

13 Claims, 8 Drawing Sheets

(51) Int. Cl.
*H04W 84/12* (2009.01)
*H04W 88/04* (2009.01)

(52) U.S. Cl.
CPC ......... *H04W 52/027* (2013.01); *H04W 88/04* (2013.01); *H04W 84/12* (2013.01)

(58) Field of Classification Search
CPC ... H04W 84/12; H04W 52/0254; H04W 4/50; H04W 52/0261; H04W 84/20; Y02D 30/70
See application file for complete search history.

(56) References Cited

U.S. PATENT DOCUMENTS

| | | | |
|---|---|---|---|
| 9,100,916 | B2 | 8/2015 | Cho |
| 9,502,752 | B2 | 11/2016 | Darnell et al. |
| 9,705,180 | B2 | 7/2017 | Darnell et al. |
| 9,706,590 | B2 | 7/2017 | Jung et al. |
| 9,799,959 | B2 | 10/2017 | Ko et al. |
| 9,820,130 | B2 | 11/2017 | Jung |
| 9,876,274 | B2 | 1/2018 | Kim et al. |
| 10,004,095 | B2 | 6/2018 | Jung |
| 10,291,695 | B2 | 5/2019 | Kwon et al. |
| 10,663,520 | B2 | 5/2020 | Park et al. |
| 11,800,453 | B2 * | 10/2023 | Jung ................ H04W 4/08 |
| 2008/0106471 | A1 | 5/2008 | Yeh |
| 2011/0080330 | A1 | 4/2011 | Lee et al. |
| 2011/0255455 | A1 | 10/2011 | Seok |
| 2012/0195227 | A1 | 8/2012 | Vedantham et al. |
| 2012/0311176 | A1 | 12/2012 | Dellinger et al. |
| 2013/0034023 | A1 | 2/2013 | Jung |
| 2014/0032951 | A1 | 1/2014 | Garg et al. |
| 2014/0192777 | A1 | 7/2014 | Seok |
| 2018/0014341 | A1 | 1/2018 | Jung |
| 2018/0192329 | A1 | 7/2018 | Medapalli et al. |

FOREIGN PATENT DOCUMENTS

| | | |
|---|---|---|
| KR | 10-2013-0015135 A | 2/2013 |
| KR | 10-2013-0052895 A | 5/2013 |
| KR | 10-2015-0017848 A | 2/2015 |
| KR | 10-2016-0016465 A | 2/2016 |
| KR | 10-1692259 B1 | 1/2017 |
| KR | 10-2018-0005471 A | 1/2018 |
| WO | 2016/111562 A1 | 7/2016 |

OTHER PUBLICATIONS

Wi-Fi Alliance; Wi-Fi Certified Direct; XP055041124; www.wi-fi.org/knowledge-center/white-papers/wi-fi-certified-wi-fi-direct%E2%84%A2-personal-portable-wi-fi%C2%AE-connect-devices; Oct. 1, 2010.
Cherif et al.; P2P Group Formation Enhancement for Opportunistic Networks with Wi-Fi Direct; 2017 IEEE Wireless Communications and Networking Conference (WCNC), IEEE; XP033095882; Mar. 19, 2017.
European Search Report dated Dec. 6, 2021; European Appln. No. 19893490.3-1212 / 3876610 PCT/KR2019016498.
Korean Office Action dated Jun. 21, 2024, issued in Korean Patent Application No. KR 10-2018-0156673.
Extended European Search Report dated Feb. 5, 2024, issued in European Patent Application No. 23203131.0.

* cited by examiner

ELECTRONIC DEVICE FOR REDUCING POWER CONSUMPTION IN NETWORK ON BASIS OF WI-FI DIRECT PROTOCOL, AND METHOD RELATED THERETO

CROSS-REFERENCE TO RELATED APPLICATION(S)

This application is a continuation application of prior application Ser. No. 17/299,187, filed on Jun. 2, 2021, which is a U.S. National Stage application under 35 U.S.C. § 371 of an International application number PCT/KR2019/016498, filed on Nov. 27, 2019, which is based on and claims priority of a Korean patent application number 10-2018-0156673, filed on Dec. 7, 2018, in the Korean Intellectual Property Office, the disclosure of which is incorporated by reference herein in its entirety.

TECHNICAL FIELD

Embodiments disclosed in the disclosure relate to an electronic device for changing an attribute of a channel in a network based on a wireless-fidelity (Wi-Fi) Direct protocol and a method thereof.

BACKGROUND ART

Wi-Fi standards define a protocol for wireless communication between terminals, as well as a protocol for wireless communication between an access point (AP) and a terminal (e.g., a smartphone or a tablet). The protocol for the wireless communication between the terminals may be referred to as Wi-Fi Direct or Wi-Fi peer-to-peer (P2P). When terminals create a P2P group based on the Wi-Fi Direct group, a specific terminal among the terminals included in the P2P group may operate as a group owner which performs substantially the same function as an AP and the other at least one terminal may operate as a group client which performs substantially the same function as a station (STA).

The terminals included in the P2P group may perform wireless communication in a specified channel. An attribute of the channel may be based on a frequency band and a bandwidth.

DISCLOSURE

Technical Problem

Unlike an AP including a power supply, because the capacity of power is limited in a portable terminal which uses a battery, a terminal operating as a group owner needs to efficiently manage power. Power consumption may be reduced by changing at least one of a frequency band or a bandwidth included in a channel attribute. However, Wi-Fi Direct standards do not define a protocol for changing an attribute of the channel after the P2P group is created. When terminals create a new group in a new channel, continuity of a service may be degraded due to a latency.

Various embodiments disclosed in the disclosure may provide an electronic device for reducing power consumption in a network based on a Wi-Fi Direct protocol and a method thereof.

Technical Solution

In accordance with an aspect of the disclosure, an electronic device is provided. The electronic device may include a display, a memory, a wireless communication circuitry configured to support a wireless fidelity (Wi-Fi) Direct protocol, and a processor operatively connected with the display, the memory, and the wireless communication circuitry. The processor may be configured to create a first group based on a first channel attribute with an external electronic device, via the wireless communication circuitry, the first channel attribute including at least one of a frequency band or a bandwidth, detect that an event associated with power save occurs, transmit a first request message requesting to change the first channel attribute to a second channel attribute, at least a portion of which differs from the first channel attribute, to the external electronic device via the wireless communication circuitry, receive a first response message from the external electronic device via the wireless communication circuitry, store a profile of the first group in the memory, and create a second group based on the second channel attribute with the external electronic device, using the profile of the first group and a connection scheme of a persistent group defined in the Wi-Fi Direct protocol.

In accordance with another aspect of the disclosure, a method of an electronic device is provided. The method may include creating a first group based on a first channel attribute including at least one of a frequency band and a bandwidth with an external electronic device, detecting that an event associated with power save occurs, transmitting a first request message requesting to change the first channel attribute to a second channel attribute, at least a portion of which differs from the first channel attribute, to the external electronic device based on the event, receiving a first response message from the external electronic device, storing a profile of the first group in a memory, and creating a second group based on the second channel attribute with the external electronic device, using the profile of the first group and a connection scheme of a persistent group defined in the Wi-Fi protocol.

In accordance with another aspect of the disclosure, an electronic device is provided. The electronic device may include a display, a wireless communication circuitry configured to support a Wi-Fi Direct protocol, a processor operatively connected with the display and the wireless communication circuitry, and a memory operatively connected with the processor. The memory may store instructions, when executed, causing the processor to create a first group based on a first channel attribute including at least one of a frequency band and a channel bandwidth of an external electronic device, via the wireless communication circuitry, detect that an event associated with power save occurs, transmit a first request message requesting to change the first channel attribute to a second channel attribute, at least a portion of which differs from the first channel attribute, to the external electronic device via the wireless communication circuitry, the first request message including a second profile, at least a portion of which differs from a first profile associated with the first group, receive a first response message from the external electronic device via the wireless communication circuitry, store the second profile in the memory, and create a second group based on the second channel attribute with the external electronic device, using the second profile and a connection scheme of a persistent group defined in the Wi-Fi protocol.

Advantageous Effects

According to various embodiments disclosed in the disclosure, the electronic device may dynamically change a channel attribute in a network based on the Wi-Fi Direct protocol to maintain a quality of service (QoS) at the same time as increasing efficiency of power consumption.

According to various embodiments disclosed in the disclosure, the electronic device may create a new P2P group using a profile of a previous P2P group in a network based on the Wi-Fi Direct protocol to reduce a time taken to create the P2P group.

In addition, various effects ascertained directly or indirectly through the disclosure may be provided.

With regard to description of drawings, the same or similar denotations may be used for the same or similar components.

MODE FOR INVENTION

Figure 1:
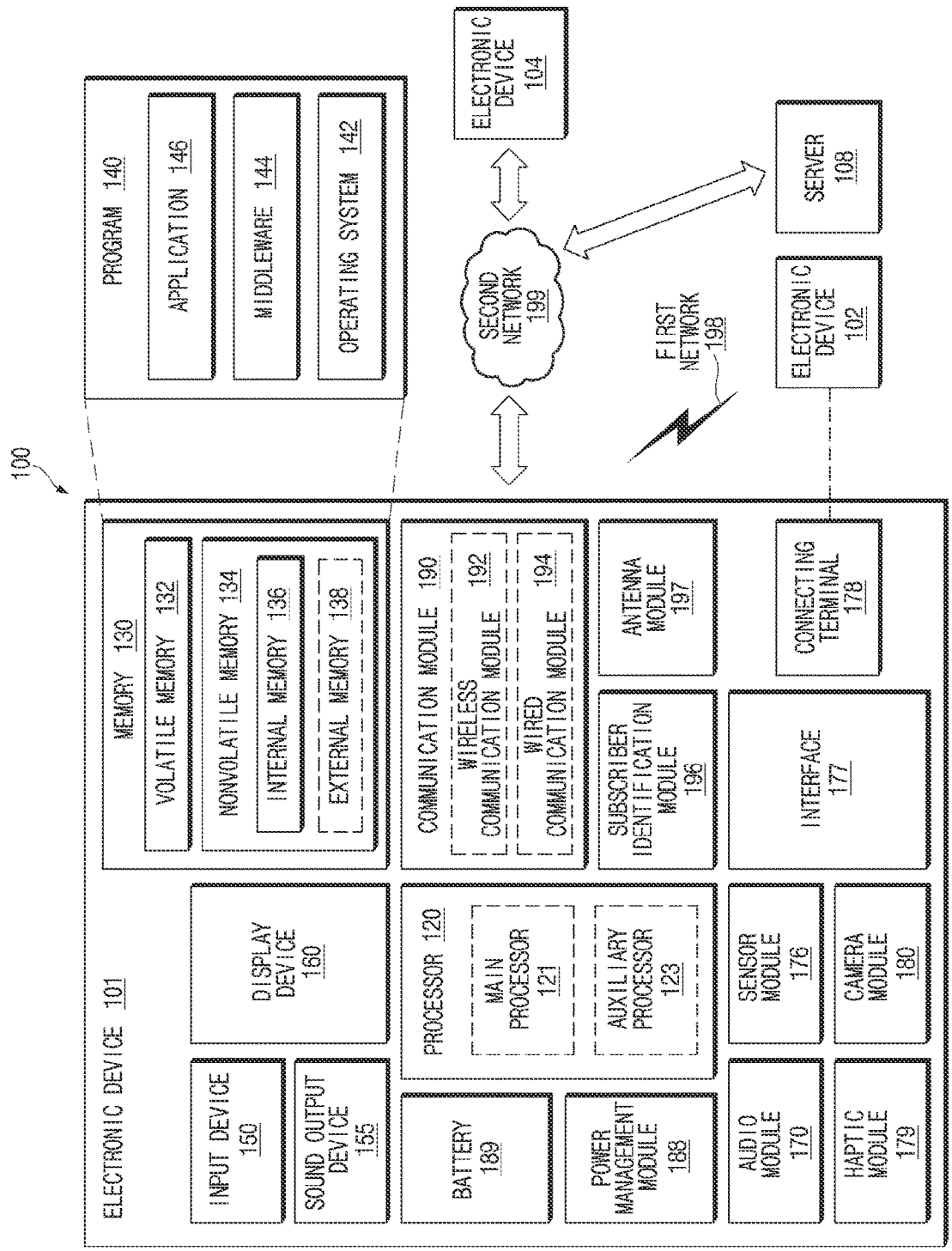
FIG. 1 is a block diagram illustrating an electronic device 101 in a network environment 100 according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
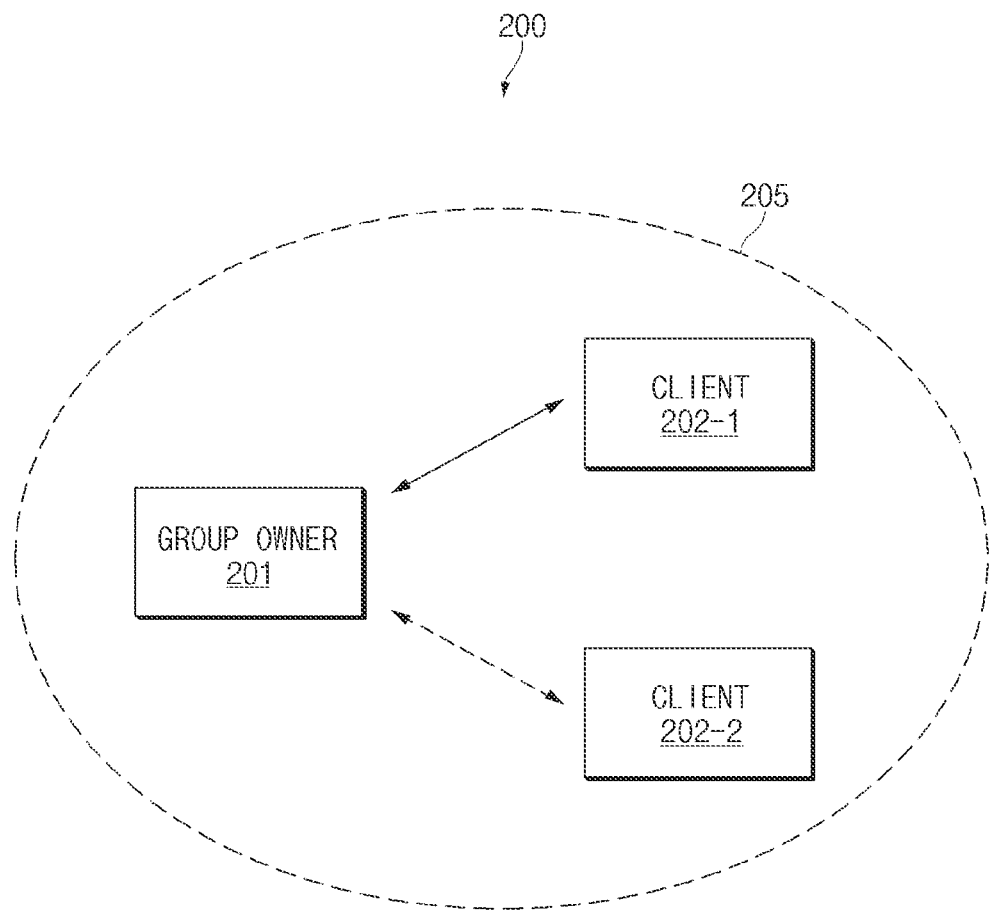
FIG. 2 illustrates a P2P group in a network environment based on W-Fi Direct standards.

FIG. 2 illustrates a P2P group 205 in a network environment 200 based on W-Fi Direct standards.

Referring to FIG. 2, terminals (e.g., 201, 202-1, and 202-2) may refer to devices used by a user, which may include a portable communication device (e.g., a smartphone or a tablet), a computer device, a portable multimedia device, a portable medical device, a camera, a wearable device, or a home appliance. The terminals shown in FIG. 2 may include the same or similar components to an electronic device 101 shown in FIG. 1 and may perform the same or similar function to the electronic device 101.

According to an embodiment, the terminals may create the P2P group 205 based on the Wi-Fi Direct standards. The P2P group 205 may include a 1:1 connection and may include a 1:n (where n is a natural number) connection. For example, the group owner 201 may be connected with the client 202-1 one to one and may be connected with the client 202-1 and the client 202-2 one to two. The number of clients connectable to the group owner 201 may be based on a capability of the group owner.

According to an embodiment, the group owner 201 may perform the same or similar function to a function of an AP, and the client 202-1 or 202-2 may perform the same or similar function to a function of an STA.

According to an embodiment, the group owner 201 and the clients 202-1 and 202-2 included in the P2P group 205 may perform wireless communication in a specified channel. An attribute of a channel may be based on a frequency band and a bandwidth. For example, the frequency band complying with institute of electrical and electronics engineers (IEEE) 802.11ac standards may include 2.4 gigahertz (GHz) and GHz, and the bandwidth may include 20 megahertz, (MHz) to 160 MHz. For another example, the frequency band complying with IEEE 802.11ad standards may include 60 GHz. For another example, the frequency band complying with IEEE 802.11ah standards may include less than 1 GHz (may be referred to as sub 1 GHz), and the bandwidth may include 1, 2, 4, and 8 MHz. The higher the frequency band, the more the data transfer rate may increase and the more the interference may decrease, but the more the coverage may decease and the more the power consumption may increase. The wider the frequency band, the more the data transfer rate may increase, but the more the power consumption may increase.

Figure 3:
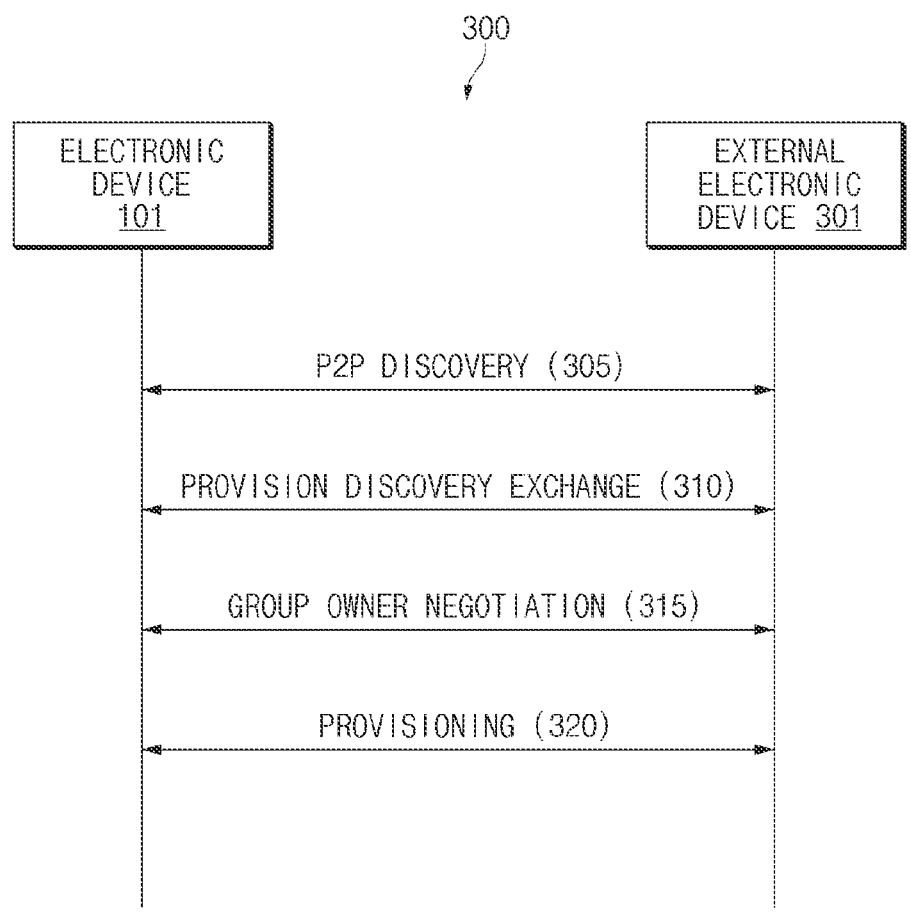
FIG. 3 illustrates a procedure flowchart for creating a P2P group.

FIG. 3 illustrates a procedure flowchart 300 for creating a P2P group 205.

Referring to FIG. 3, an electronic device 101 and an external electronic device 301 may perform the same or similar function to terminals (e.g., 201, 202-1, and 202-2) shown in FIG. 2. The electronic device 101 and the external electronic device 301 may create the P2P group 205 and may operate as a group owner (e.g., 201 of FIG. 2) or a client (e.g., 202-1 or 202-2 of FIG. 2).

In operation 305, the electronic device 101 according to an embodiment may perform a P2P discovery procedure to identify presence of the external electronic device 301. For example, the electronic device 101 may exchange a probe request message and a probe response message with the external electronic device 301 to identify the presence of the external electronic device 301.

When the external electronic device 301 is identified, in operation 310, the electronic device 101 according to an embodiment may perform a provision discovery exchange procedure to request the external electronic device 301 to connect. For example, the electronic device 101 may transmit a message (e.g., a provision discovery request message) requesting the external electronic device 301 to connect, and the external electronic device 301 may request triggering (e.g., connection request acknowledgment) from a user. When the input triggering the connection is received from the user, the external electronic device 301 may transmit a response message to the electronic device 101.

When the provision discovery exchange procedure is performed, in operation 315, the electronic device 101 according to an embodiment may perform a group owner (GO) negotiation procedure with the external electronic device 301 to determine a group owner (e.g., 201 of FIG. 2) and a client (e.g., 202-1 of FIG. 2). For example, the electronic device 101 and the external electronic device 301 may exchange a GO negotiation request message and a GO negotiation response message.

According to an embodiment, the electronic device 101 and the external electronic device 301 may determine attribution of a P2P group (e.g., the P2P group 205 of FIG. 2) through the GO negotiation procedure. The attribution of the P2P group 205 may include a temporary group and a persistent group.

When the GO negotiation procedure is performed, in operation 320, the electronic device 101 according to an embodiment may perform a provisioning procedure with the external electronic device 301 to exchange a credential. The credential may include information for encryption. For example, the credential may include at least one of an authentication type, an encryption type, a network key, or a service set identifier (SSID).

When the provisioning procedure is performed, the P2P group 205 between the electronic device 101 and the external electronic device 301 may be created. The electronic device 101 may perform wireless communication over a channel having a specified channel attribute with the external electronic device 301. For example, the electronic device 101 may operate as a GO, and the external electronic device 301 may operate as a group client (GC). When operating as the GO, the electronic device 101 may set attribution of the group or may trigger a reconnection operation (e.g., operation 410 of FIG. 4).

Because the P2P group 205 is a group created to perform wireless communication between terminals without an AP, a security problem between terminals may occur. According to an embodiment, the electronic device 101 and the external electronic device 301 may determine the attribution of the P2P group 205 as a temporary group in the GO negotiation procedure to reduce risk of security. When the attribution of the P2P group 205 is the temporary group, after the connection between the electronic device 101 and the external electronic device 301 is terminated, the electronic device 101 and the external electronic device 301 may delete a profile of the P2P group 205 from a memory. The profile of the P2P group 205 may include at least one of, for example, identification information of the P2P group 205, a credential, information of the electronic device 101 and the external electronic device 301, or an operation mode (e.g., a group owner or client). To re-create the P2P group 205 with the external electronic device 301, the electronic device 101 may perform the procedure shown in FIG. 3 again with the external electronic device 301.

Figure 4:
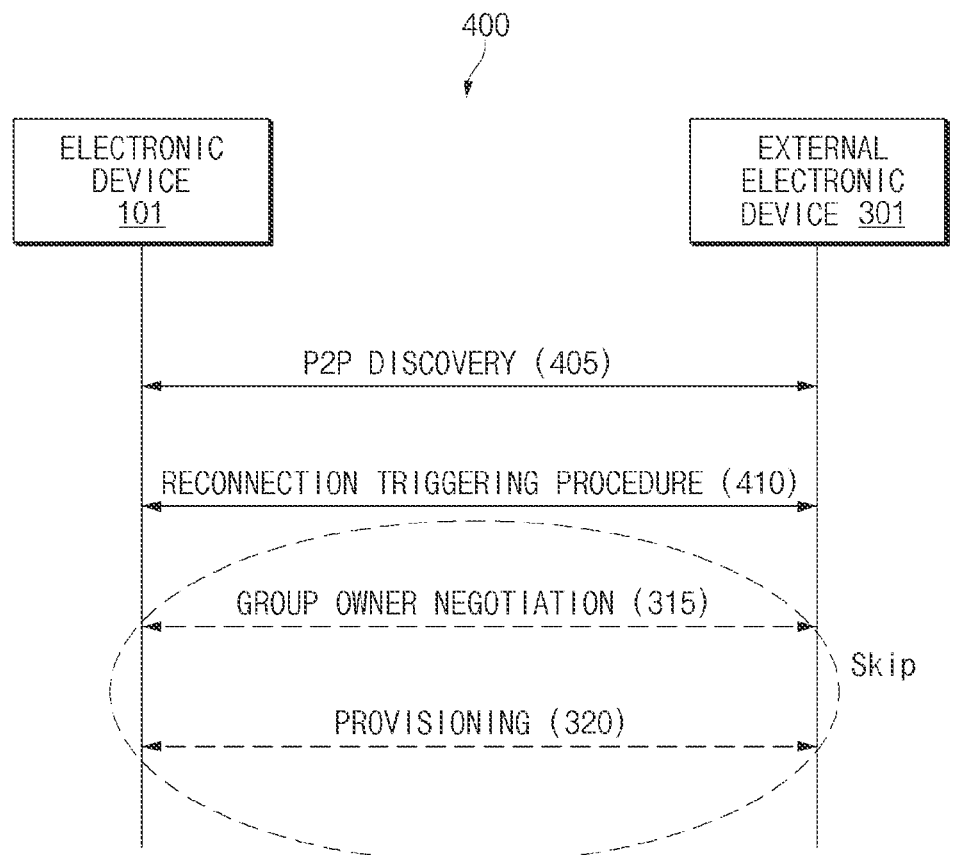
FIG. 4 illustrates a procedure flowchart for re-creating a P2P group when operating as a persistent group.

FIG. 4 illustrates a procedure flowchart 400 for re-creating a P2P group when operating as a persistent group.

Referring to FIG. 4, in operation 405, an electronic device 101 may perform a P2P discovery procedure with an external electronic device 301 (e.g., 305 of FIG. 3).

When the external electronic device 301 is identified, in operation 410, the electronic device 101 may perform a reconnection triggering procedure with the external electronic device 301. For example, the electronic device 101 may exchange an invitation request message and an invitation response message. The invitation request message may include at least a portion of a profile of a P2P group 205. For another example, the electronic device 101 may perform a provision discovery exchange procedure (e.g., an operation 310 of FIG. 3) with the external electronic device 301. A provision discovery request message may include at least a portion of the profile of the P2P group 205.

According to an embodiment, the electronic device 101 may determine attribution of the P2P group 205 as a persistent group to quickly perform reconnection after the connection with the external electronic device 301 is terminated. When the attribution of the P2P group 205 is the persistent group, after the connection between the electronic device 101 and the external electronic device 301 is terminated, the electronic device 101 and the external electronic device 301 may store the profile of the P2P group 205 in a memory. The electronic device 101 and the external electronic device 301 may omit a GO negotiation procedure (e.g., operation 315) and a provisioning procedure (e.g., operation 320) based on the stored profile of the P2P group 205 and may re-create the P2P group 205, thus enhancing a connection speed.

Figure 5:
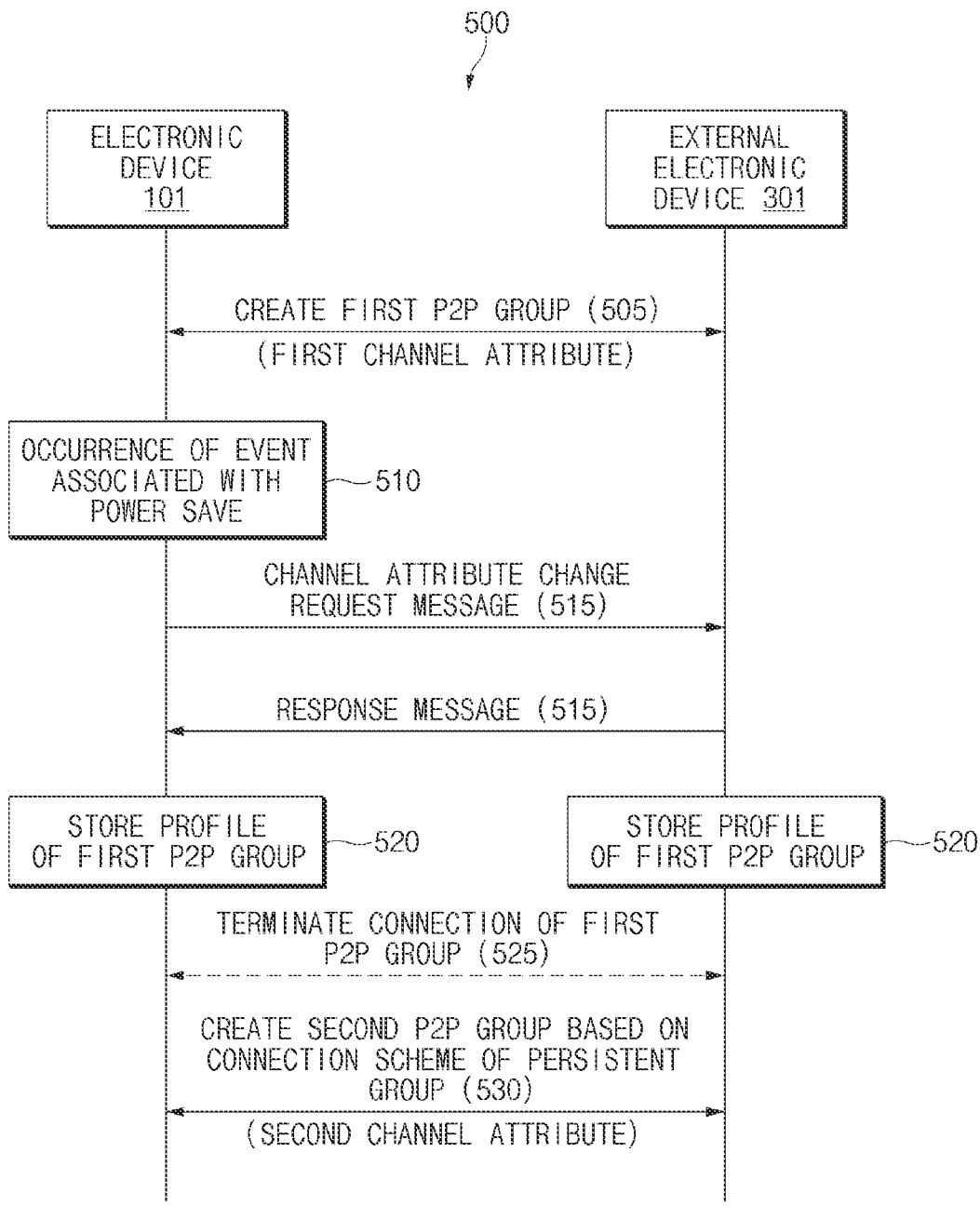
FIG. 5 illustrates a signal sequence diagram for changing a channel attribute according to various embodiments.

FIG. 5 illustrates a signal sequence diagram 500 for changing a channel attribute according to various embodiments.

Referring to FIG. 5, in operation 505, an electronic device 101 may create a first P2P group based on a first channel attribute with an external electronic device 301. For example, the electronic device 101 may perform operations 305 to 320 shown in FIG. 3 to create the first P2P group. The first channel attribute may include a first frequency band and a first bandwidth. The first frequency band may include one of, for example, sub 1 GHz, 2.4 GHz, 5 GHz, or 60 GHz, and the first bandwidth may include one of, for example, 1 MHz to 8 MHz or 20 MHz to 160 MHz.

According to an embodiment when the first P2P group is generated, the electronic device 101 and the external electronic device 301 may perform wireless communication based on a profile of the first P2P group.

According to an embodiment, the electronic device 101 and the external electronic device 301 may exchange data through the first P2P group. For example, the electronic device 101 and the external electronic device 301 may perform at least one of file sharing, screen mirroring, mobile printing, group chatting, or mobile tethering.

In operation 510, the electronic device 101 according to an embodiment may detect that an event associated with power save occurs. The event associated with the power save may refer to an event which needs to reduce power consumption of the electronic device 101. For example, when a data rate of a transmit signal or a receive signal between the electronic device 101 and the external electronic device 301 is less than a threshold during a specified time, when a screen of a display (e.g., a display device 160 of FIG. 1) of the electronic device 101 changes from an on-state to an off-state, when an application connected through the first P2P group (or run in the electronic device 110 and the external electronic device 301 through the first P2P group) ends or pauses, the electronic device 101 may detect that the event associated with the power save occurs. For another example, when a user input selecting a power save mode is received or when detecting that the external electronic device 301 enters the power save mode, the electronic device 101 may detect that the event associated with the power save occurs.

In operation 515, the electronic device 101 may transmit a request message requesting to change a channel attribute to the electronic device 301. According to an embodiment, the electronic device 101 may determine to change a channel attribute to a second channel attribute, at least a portion of which differs from the first channel attribute. For example, when the second channel attribute includes a second frequency band and a second bandwidth, the second frequency band may be less than the first frequency band, the second bandwidth may be less than the first bandwidth, or the second frequency band may be less than the first frequency band and the second bandwidth may be less than the first bandwidth. The request message may include information associated with the second channel attribute.

According to an embodiment, the request message may include at least one of a generic advertisement service frame, an action frame, a data frame, or a control frame based on IEEE 802.11u standards.

According to an embodiment, the electronic device 101 may insert information requesting to change attribution of the P2P group from a temporary group to a persistent group into the request message. For example, the request message may include one bit information requesting to change the attribution of the P2P group. For another example, the request message may include at least a portion of a profile of the first P2P group. Although not illustrated in FIG. 5, according to another embodiment, the electronic device 101 may transmit information requesting to change the attribution of the P2P group by means of a separate message.

In operation 520, the second electronic device 101 may receive a response message from the external electronic device 301. According to an embodiment, the response message may include information indicating accept or rejection of the request to change the channel attribute.

According to an embodiment, the response message may include information associated with a third channel attribute, at least a portion of which differs from the second channel attribute. For example, when the external electronic device 301 is unable to support the second channel attribute by a capability of the external electronic device 301, it may determine the third channel attribute. When the third channel attribute includes a third frequency band and a third bandwidth, the third frequency band may be less than the first frequency band, the third bandwidth may be less than the first bandwidth, or the third frequency band may be less than the first frequency band and the third bandwidth may be less than the first bandwidth.

In operation 525, the electronic device 101 and the external electronic device 301 may store the profile of the first P2P group in a memory (e.g., a memory 130 of FIG. 1) to operate as a persistent group. According to another embodiment, the electronic device 101 and the external electronic device 301 may perform operation 530 without performing operation 525.

In operation 530, the electronic device 101 and the external electronic device 301 may terminate the connection of the first P2P group.

In operation 535, the electronic device 101 may create a second P2P group based on the second channel attribute (or the third channel attribute) with the external electronic device 301. According to an embodiment, the electronic device 101 may create a second P2P group depending on a connection scheme of a persistent group shown in FIG. 4 using the profile of the first P2P group to quickly create the second P2P group.

According to an embodiment, the electronic device 101 and the external electronic device 301 may delete the profile of the first P2P group, which is stored in the memory, after the second P2P group is created.

Although not illustrated in FIG. 5, according to another embodiment, the electronic device 101 and the external electronic device 301 may create the second P2P group using a profile (hereinafter referred to as "second profile"), at least a portion of which differs from a profile (hereinafter referred to as "first profile") of the first P2P group. For example, in operation 515, the electronic device 101 may transmit a request message including the second profile to the external electronic device 301. In this case, the electronic device 101 and the external electronic device 301 may store the second profile in operation 525 and may create the second P2P group depending on the connection scheme of the persistent group using the second profile in operation 530.

Figure 6:
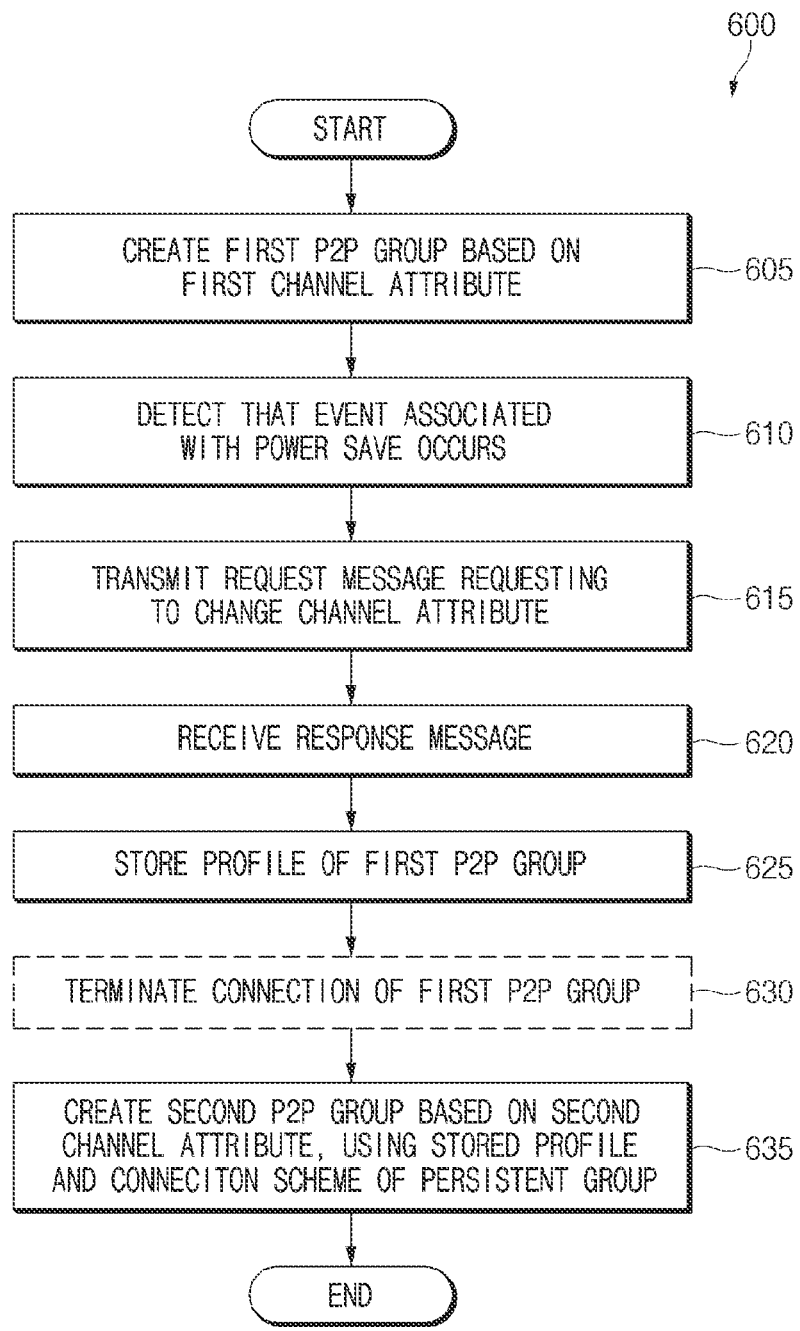
FIG. 6 illustrates an operational flowchart of an electronic device for changing a channel attribute to a second channel attribute according to various embodiments.

FIG. 6 illustrates an operational flowchart 600 of an electronic device 101 for changing a channel attribute to a second channel attribute according to various embodiments. The optional flowchart 600 of FIG. 6 and operations of operational flowcharts described below may be performed by an electronic device 101 or a component (e.g., a processor 120 of FIG. 1) of the electronic device 101.

Referring to FIG. 6, in operation 605, the electronic device 101 may create a first P2P group based on a first channel attribute with an external electronic device (e.g., an external electronic device 301 of FIG. 3). The first channel attribute may include, for example, a first frequency band and a first bandwidth.

In operation 610, the electronic device 101 may detect that an event associated with power save occurs after the first P2P group is created.

In operation 615, the electronic device 101 may transmit a message requesting to change a channel attribute to the external electronic device. According to an embodiment, the electronic device 101 may request to change the channel attribute to a second channel attribute, at least a portion of which differs from the first channel attribute.

In operation 620, the electronic device 101 may receive a response message from the external electronic device.

In operation 625, the electronic device 101 may store a profile (e.g., a first profile of FIG. 5) of the first P2P group. For another example, the electronic device 101 may store a profile (e.g., a second profile of FIG. 5) to which at least a portion of the profile of the first P2P group is changed.

In operation 630, the electronic device 101 may terminate the connection of the first P2P group. According to another embodiment, the electronic device 101 may perform operation 635 without terminating the connection of the first P2P group.

In operation 635, the electronic device 101 may create the second P2P group based on the second channel attribute using the stored profile (e.g., the first profile or the second profile) and a connection scheme of a persistent group. For example, the electronic device 101 may perform operations 405 and 410 of FIG. 4.

Figure 7:
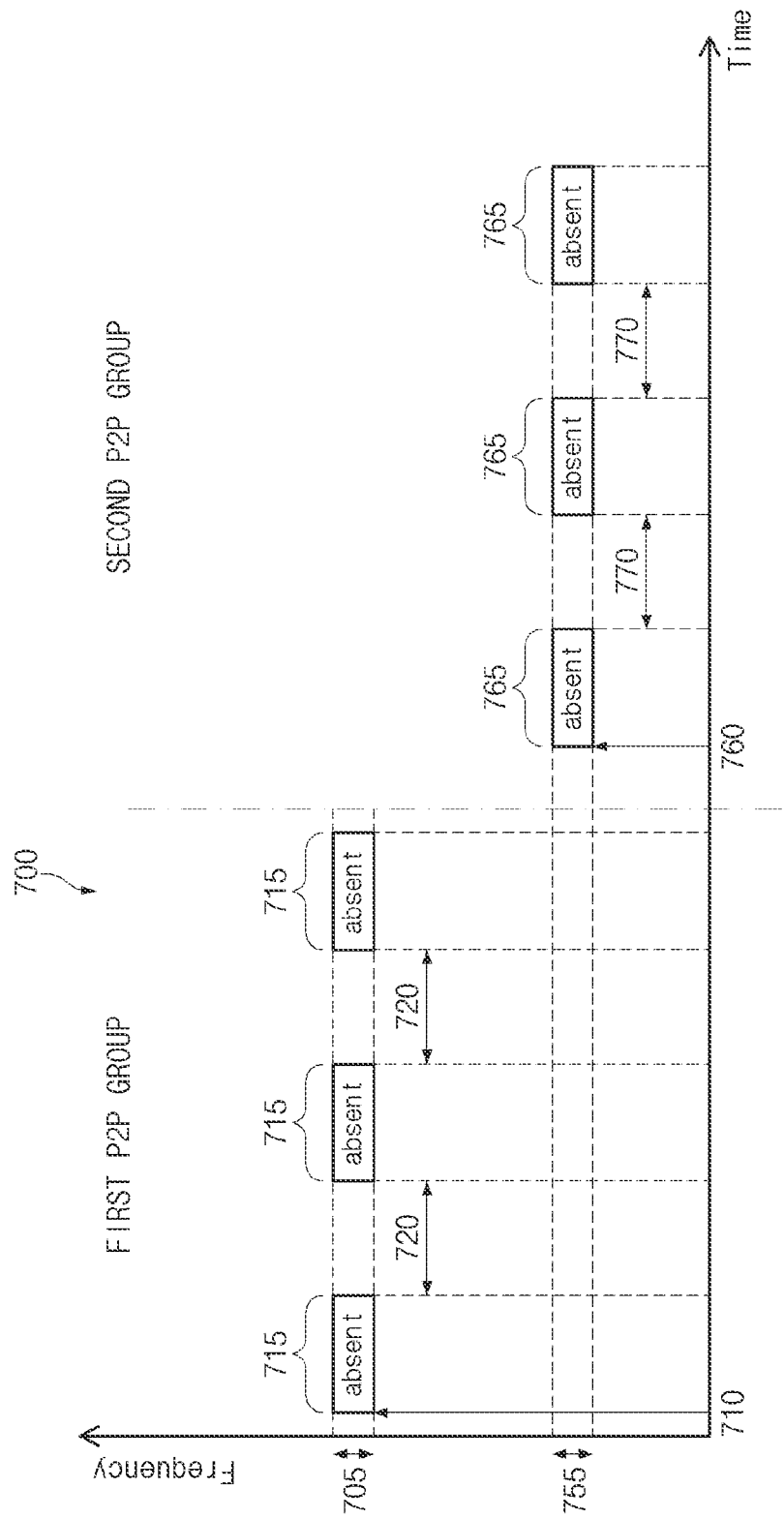
FIG. 7 illustrates a graph indicating a notice of absence (NoA) operation according to various embodiments.

FIG. 7 illustrates a graph 700 indicating a notice of absence (NoA) operation according to various embodiments.

Referring to FIG. 7, when an electronic device 101 operates as a group owner (e.g., a group owner 201 of FIG. 2) and when an external electronic device 301 operates as a client (e.g., a client 202-1 or 202-2 of FIG. 2), the electronic device 101 may perform a NoA operation of not transmitting data to the external electronic device 301 during a specified duration. The electronic device 101 may perform the NoA operation to additionally reduce power consumption.

For example, the electronic device 101 may perform the NoA operation, after a first P2P group based on a first channel attribute is created. The first channel attribute may include, for example, a first frequency band 705. The electronic device 101 may transmit a message indicating the NoA operation to the external electronic device 301 to perform the NoA operation. The message indicating the NoA may be, for example, a beacon signal or a probe response message. The beacon signal or the probe response message may include information associated with the NoA operation. The information associated with the NoA operation may include, for example, a timing of the NoA operation or scheduling information of the NoA operation. For another example, the message indicating the NoA may be a separate message.

During a period when the NoA operation is performed, the electronic device 101 and the external electronic device 301 may synchronize a duration where power consumption is reduced. For example, the electronic device 101 and the external electronic device 301 may operate in a non-active mode during a series of consecutive first durations (e.g., 715) from a specified first time point 710. In the non-active mode, the electronic device 101 and the external electronic device 301 may fail to transmit data. During a series of consecutive second durations 720, the electronic device 101 and the external electronic device 301 may operate in an active mode. In the active mode, the electronic device 101 and the external electronic device 301 may transmit data.

According to an embodiment, when a second P2P group is created in a second frequency band 733, at least a portion of which differs from the first frequency band 705, the electronic device 101 may perform the NoA operation after the second P2P group is created. For example, the electronic device 101 and the external electronic device 301 may operate in the non-active mode during a series of consecutive third durations 765 from a specified second time point 760 and may operate in the active mode during a series of consecutive fourth durations 770. The length of the third duration may be the same or differ from the length of the first duration, and the length of the fourth duration may be the same or differ from the length of the second duration.

FIG. 7 illustrates the embodiment in which the NoA operation is newly triggered after the second P2P group is created. However, according to another embodiment, the electronic device 101 and the external electronic device 301 may create the second P2P group while the NoA operation is performed in the first P2P group. For example, when the second P2P group is created while performing the NoA operation in the first frequency band 705, the electronic device 101 and the external electronic device 301 may change the frequency band to the second frequency band 755 during the same duration (e.g., the first duration and the second duration).

Figure 8:
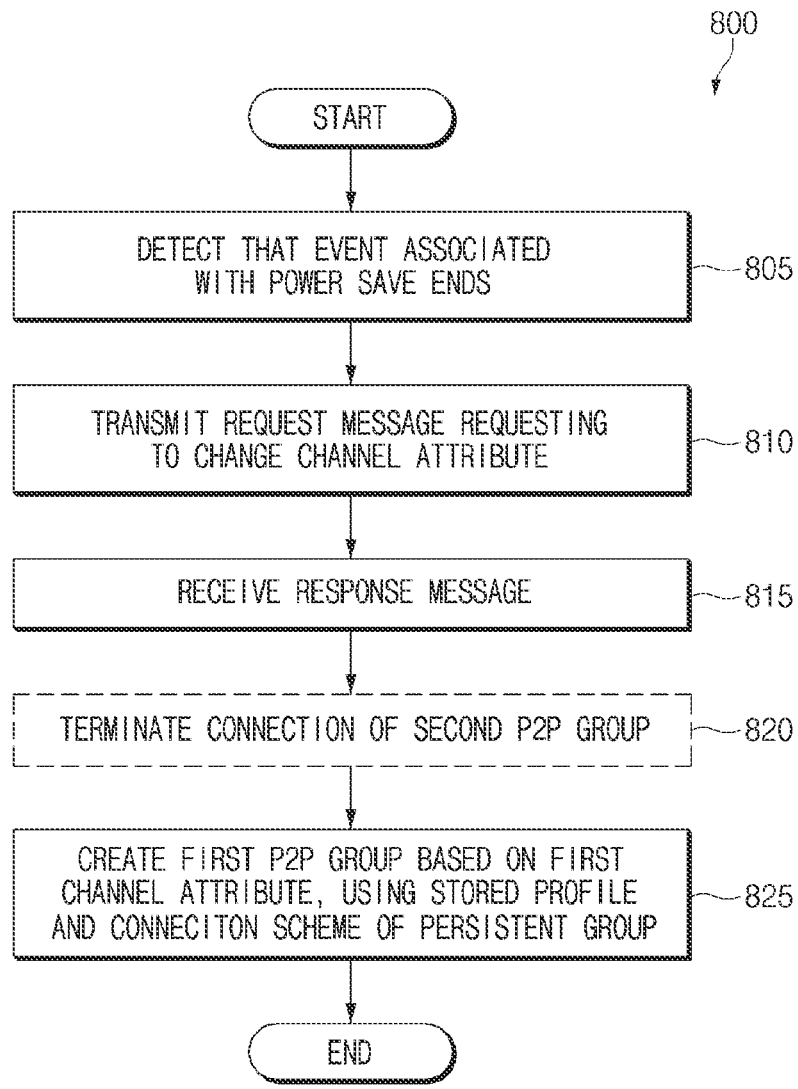
FIG. 8 illustrates an operational flowchart of an electronic device for changing a channel attribute to a first channel attribute according to various embodiments.

FIG. 8 illustrates an operational flowchart 800 of an electronic device 101 for changing a channel attribute to a first channel attribute according to various embodiments. Operations shown in FIG. 8 may be performed after operation 635 of FIG. 6.

Referring to FIG. 8, in operation 805, an electronic device 101 may detect that an event associated with power save ends after the second P2P group is created. For example, when a data rate of a transmit signal or a receive signal between the electronic device 101 and an external electronic device 301 is greater than or equal to a threshold during a specified time, when a screen of the display of the electronic device 101 changes from an off-state to an on-state, or when an application is run or played, the electronic device 101 may detect that the event associated with the power save ends. For another example, when a user input releasing a power save mode is received or when detecting that the external electronic device 301 releases the power save mode, the electronic device 101 may detect that the event associated with the power save ends.

In operation 810, the electronic device 101 may transmit a second request message requesting to change a channel attribute to the external electronic device 301. For example, the electronic device 101 may request the external electronic device 301 to change a second channel attribute to a first channel attribute. For another example, the electronic device 101 may request the external electronic device 301 to change the second channel attribute to a fourth channel attribute, at least a portion of which differs from the first channel attribute and the second channel attribute. When the fourth channel attribute includes a fourth frequency band and a fourth bandwidth, the fourth frequency band may be greater than the second frequency band, the fourth bandwidth may be greater than the second bandwidth, or the fourth frequency band may be greater than the second frequency band and the fourth bandwidth may be greater than the second bandwidth. According to an embodiment, the second request message may include information associated with the first channel attribute or information associated with the fourth channel attribute.

According to an embodiment, the second request message may include at least one of a generic advertisement service frame, an action frame, a data frame, or a control frame based on IEEE 802.11u standards.

In operation 815, the electronic device 101 may receive a second response message from the external electronic device. According to an embodiment, the second response message may include information indicating accept or rejection of the request to change the channel attribute.

In operation 820, the electronic device 101 may terminate the connection of the second P2P group, when receiving the second response message including accept information about the change in channel attribute. According to another embodiment, the electronic device 101 may perform operation 825 in response to receiving the second response message, without performing operation 825.

In operation 825, the electronic device 101 may create a first P2P group based on a first channel attribute with the external electronic device 301 using the stored profile (e.g., a first profile or a second profile of FIG. 5) and a connection scheme of a persistent group. For another example, the electronic device 101 may create a third P2P group based on the fourth channel attribute with the external electronic device 301.

As described above, an electronic device (e.g., 101 of FIG. 1) may include a display (e.g., at least a part of a display device 160 of FIG. 1), a memory (e.g., 130 of FIG. 1), a wireless communication circuitry (e.g., at least a part of a wireless communication module 192 of FIG. 1) supporting a Wi-Fi Direct protocol, and a processor (e.g., 120 of FIG. 1) operatively connected with the display, the memory, and the wireless communication circuitry, The processor may be configured to create a first group (e.g., a first P2P group of FIG. 1) based on a first channel attribute with an external electronic device (e.g., 301 of FIG. 3), via the wireless communication circuitry, the first channel attribute including at least one of a frequency band or a bandwidth, detect that an event associated with power save occurs, transmit a first request message requesting to change the first channel attribute to a second channel attribute, at least a portion of which differs from the first channel attribute, to the external electronic device via the wireless communication circuitry, receive a first response message from the external electronic device via the wireless communication circuitry, store a profile of the first group in the memory, and create a second group (e.g., a second P2P group of FIG. 5) based on the second channel attribute with the external electronic device, using the profile of the first group and a connection scheme of a persistent group defined in the Wi-Fi Direct protocol.

According to an embodiment, the processor may be configured to detect that the event associated with the power save occurs, when a data rate of a transmit signal or a receive signal between the electronic device and the external electronic device is less than a threshold during a specified time, when a screen of the display changes from an on-state to an off-state, or when an application run in the electronic device and the external electronic device ends or pauses.

According to an embodiment, a frequency band of the second channel attribute may be less than a frequency band of the first channel attribute, a bandwidth of the second channel attribute may be less than a bandwidth of the first channel attribute, or the frequency band and the bandwidth of the second channel attribute may be less than the frequency band and the bandwidth of the first channel attribute.

According to an embodiment, the first request message may include information indicating to change group attribution of the first group from a temporary group to the persistent group.

According to an embodiment, the first response message may include information of a third channel attribute, at least a portion of which differs from the second channel attribute. The processor may be configured to create a third group based on the third channel attribute with the external electronic device, using the profile of the first group and the connection scheme of the persistent group.

According to an embodiment, the processor may be configured to, when the second group is created, perform wireless communication with the external electronic device using a NoA defined in the Wi-Fi protocol.

According to an embodiment, the processor may be configured to detect that the event associated with the power save ends, after the second group is created, transmit a second request message requesting to change the second channel attribute to the first channel attribute to the external electronic device, via the wireless communication circuitry, receive a second response message from the external electronic device via the wireless communication circuitry, terminate a connection of the second group, and create the first group with the external electronic device, using the profile of the first group and the connection scheme of the persistent group.

According to an embodiment, the first request message may include at least one of a generic advertisement service frame, an action frame, a data frame, or a control frame based on the Wi-Fi protocol.

According to an embodiment, the profile of the first group may include at least one of identification information of the first group, a credential of the first group, information of the external electronic device, or an operation mode in the first group.

As described above, a method of an electronic device (e.g., 101 of FIG. 1) for supporting a Wi-Fi Direct protocol may include creating a first group (e.g., a first P2P group of FIG. 5) based on a first channel attribute including at least one of a frequency band and a bandwidth with an external electronic device, detecting that an event associated with power save occurs, transmitting a first request message requesting to change the first channel attribute to a second channel attribute, at least a portion of which differs from the first channel attribute, to the external electronic device based on the event, receiving a first response message from the external electronic device, storing a profile of the first group in a memory, and creating a second group (e.g., a second P2P group of FIG. 5) based on the second channel attribute with the external electronic device, using the profile of the first group and a connection scheme of a persistent group defined in the Wi-Fi protocol.

According to an embodiment, the detecting that the event associated with the power save occurs may include detecting that a data rate of a transmit signal or a receive signal between the electronic device and the external electronic device is less than a threshold during a specified time, detecting that a screen of a display of the electronic device changes from an on-state to an off-state, or detecting that an application run in the electronic device and the external electronic device ends or pauses.

According to an embodiment, a frequency band of the second channel attribute may be less than a frequency band of the first channel attribute, a bandwidth of the second channel attribute may be less than a bandwidth of the first channel attribute, or the frequency band and the bandwidth of the second channel attribute may be less than the frequency band and the bandwidth of the first channel attribute.

According to an embodiment, the first request message may include information indicating to change group attribution of the first group from a temporary group to the persistent group.

According to an embodiment, the method may further include, when the second group is created, performing wireless communication with the external electronic device using a NoA defined in the Wi-Fi protocol.

According to an embodiment, the method may further include detecting that the event associated with the power save ends, after the second group is created, transmitting a second request message requesting to change the second channel attribute to the first channel attribute to the external electronic device, receiving a second response message from the external electronic device, terminating a connection of the second group, and creating the first group with the external electronic device, using the profile and the connection scheme of the persistent group.

As described above, an electronic device (e.g., 101 of FIG. 1) may include a display (e.g., at least a part of a display device 160 of FIG. 1), a wireless communication circuitry (e.g., at least a part of a wireless communication module 192 of FIG. 1) supporting a Wi-Fi Direct protocol, a processor (e.g., 120 of FIG. 1) operatively connected with the display, and the wireless communication circuitry, and a memory (e.g., 130 of FIG. 1) operatively connected with the processor. The memory may store instructions, when executed, causing the processor to create a first group (e.g., a first P2P group of FIG. 5) based on a first channel attribute including at least one of a frequency band and a channel bandwidth of an external electronic device, via the wireless communication circuitry, detect that an event associated with power save occurs, transmit a first request message requesting to change the first channel attribute to a second channel attribute, at least a portion of which differs from the first channel attribute, to the external electronic device via the wireless communication circuitry, the first request message including a second profile, at least a portion of which differs from a first profile associated with the first group, receive a first response message from the external electronic device via the wireless communication circuitry, store the second profile in the memory, and create a second group (e.g., a second P2P group of FIG. 5) based on the second channel attribute with the external electronic device, using the second profile and a connection scheme of a persistent group defined in the Wi-Fi protocol.

According to an embodiment, the instructions may cause the processor to detect that the event associated with the power save occurs, when a data rate of a transmit signal or a receive signal between the electronic device and the external electronic device is less than a threshold during a specified time, when a screen of the display changes from an on-state to an off-state, or when an application run in the electronic device and the external electronic device ends or pauses.

According to an embodiment, a frequency band of the second channel attribute may be less than a frequency band of the first channel attribute, a bandwidth of the second channel attribute may be less than a bandwidth of the first channel attribute, or the frequency band and the bandwidth of the second channel attribute may be less than the frequency band and the bandwidth of the first channel attribute.

According to an embodiment, the instructions may cause the processor to, when the second group is created, perform wireless communication with the external electronic device using a NoA defined in the Wi-Fi protocol.

According to an embodiment, the instructions may cause the processor to detect that the event associated with the power save ends, after the second group is created, transmit a second request message requesting to change the second channel attribute to the first channel attribute to the external electronic device, via the wireless communication circuitry, receive a second response message from the external electronic device via the wireless communication circuitry, terminate a connection of the second group, and create the first group with the external electronic device, using the second profile of the first group and the connection scheme of the persistent group.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device, comprising:
a display;
a memory;
a wireless communication circuitry configured to support a wireless fidelity, Wi-Fi, protocol; and
a processor operatively connected with the memory, and the wireless communication circuitry,
wherein the processor is configured to:
perform wireless communication with an external electronic device based on a first channel attribute, via the wireless communication circuitry, the first channel attribute including at least one of a frequency band or a bandwidth,
detect that an event associated with power save occurs,
in response to detection of the event associated with power save, transmit a first request message requesting to change the first channel attribute to a second channel attribute, at least a portion of which differs from the first channel attribute, to the external electronic device via the wireless communication circuitry,
receive a first response message from the external electronic device via the wireless communication circuitry,
in response to the first response, perform the wireless communication with the external electronic device based on the second channel attribute,
detect that the event associated with the power save ends,
transmit a second request message requesting to change the second channel attribute to the first channel attribute to the external electronic device, via the wireless communication circuitry,
receive a second response message from the external electronic device via the wireless communication circuitry, and
in response to the second response, perform the wireless communication with the external electronic device based on the first channel attribute, and
wherein wireless communication based on the frequency band or the bandwidth included in the second channel attribute consumes power less than power consumed by wireless communication based on the frequency band or the bandwidth included in the first channel attribute.

2. The electronic device of claim 1, wherein the processor is further configured to:
detect that the event associated with the power save occurs, when a data rate of a transmit signal or a receive signal between the electronic device and the external electronic device is less than a threshold during a specified time, when a screen of the display changes from an on-state to an off-state, or when an application run in the electronic device and the external electronic device ends or pauses.

3. The electronic device of claim 1,
wherein the first response message includes information of a third channel attribute, at least a portion of which differs from the second channel attribute,
wherein the processor is further configured to:
  perform the wireless communication with the external electronic device based on the third channel attribute, and
wherein the frequency band or the bandwidth included in the third channel attribute is less than the frequency band or the bandwidth included in the first channel attribute.

4. The electronic device of claim 1, wherein the processor is further configured to:
  perform the wireless communication with the external electronic device based on the second channel attribute by using a notice of absence (NoA) defined in the Wi-Fi protocol.

5. The electronic device of claim 1, wherein the first request message includes at least one of a generic advertisement service frame, an action frame, a data frame, or a control frame based on the Wi-Fi protocol.

6. The electronic device of claim 1,
wherein the processor is further configured to store a profile associated with the wireless communication based on the first channel attribute, and
wherein the profile includes at least one of identification information of a first group, a credential of the first group, information of the external electronic device, or an operation mode in the first group.

7. The electronic device of claim 6, wherein the processor is further configured to perform the wireless communication based on the second channel attribute by using the profile.

8. A method of an electronic device for supporting a wireless fidelity, Wi-Fi, protocol, the method comprising:
  performing wireless communication with an external electronic device based on a first channel attribute including at least one of a frequency band and a bandwidth;
  detecting that an event associated with power save occurs;
  transmitting a first request message requesting to change the first channel attribute to a second channel attribute, at least a portion of which differs from the first channel attribute, to the external electronic device based on the event;
  receiving a first response message from the external electronic device; and
  in response to the first response, performing the wireless communication with the external electronic device based on the second channel attribute;
  detecting that the event associated with the power save ends;
  transmitting a second request message requesting to change the second channel attribute to the first channel attribute to the external electronic device;
  receiving a second response message from the external electronic device; and
  in response to the second response, performing the wireless communication with the external electronic device based on the first channel attribute,
wherein wireless communication based on the frequency band or the bandwidth included in the second channel attribute consumes power less than power consumed by wireless communication based on the frequency band or the bandwidth included in the first channel attribute.

9. The method of claim 8, wherein detecting that the event associated with the power save occurs includes:
  detecting that a data rate of a transmit signal or a receive signal between the electronic device and the external electronic device is less than a threshold during a specified time;
  detecting that a screen of a display of the electronic device changes from an on-state to an off-state; or
  detecting that an application run in the electronic device and the external electronic device ends or pauses.

10. The method of claim 8,
wherein the first response message includes information of a third channel attribute, at least a portion of which differs from the second channel attribute, and
wherein the method is further comprises performing the wireless communication with the external electronic device based on the third channel attribute, wherein the frequency band or the bandwidth included in the third channel attribute is less than the frequency band or the bandwidth included in the first channel attribute.

11. The method of claim 8, wherein the performing the wireless communication with the external electronic device based on the second channel attribute comprises:
  performing the wireless communication with the external electronic device using a notice of absence (NoA) defined in the Wi-Fi protocol.

12. The method of claim 8, wherein the first request message includes at least one of a generic advertisement service frame, an action frame, a data frame, or a control frame based on the Wi-Fi protocol.

13. The method of claim 8, further comprising:
  storing a profile associated with the wireless communication based on the first channel attribute, wherein the profile includes at least one of identification information of a first group, a credential of the first group, information of the external electronic device, or an operation mode in the first group,
wherein the performing the wireless communication with the external electronic device based on the second channel attribute comprises performing the wireless communication by using the profile.

* * * * *